United States Patent
Suzumura et al.

(10) Patent No.: US 6,932,566 B2
(45) Date of Patent: Aug. 23, 2005

(54) GAS TURBINE SHROUD STRUCTURE

(75) Inventors: Nobuyuki Suzumura, Higashimurayama (JP); Takeshi Nakamura, Nerima-ku (JP); Tadashi Natsumura, Higashimurayama (JP); Takahito Araki, Suginami-ku (JP); Kenichiro Watanabe, Tokorozawa (JP)

(73) Assignee: Ishikawajima-Harima Heavy Industries Co., Ltd., Tokyo (JP)

( * ) Notice: Subject to any disclaimer, the term of this patent is extended or adjusted under 35 U.S.C. 154(b) by 116 days.

(21) Appl. No.: 10/375,029

(22) Filed: Feb. 28, 2003

(65) Prior Publication Data
US 2004/0005216 A1 Jan. 8, 2004

(30) Foreign Application Priority Data
Jul. 2, 2002 (JP) .......................... 2002-193283

(51) Int. Cl.⁷ .............................................. F01D 25/26
(52) U.S. Cl. ..................... 415/135; 415/137; 415/138
(58) Field of Search ............................... 415/135, 136, 415/137, 138, 173.1, 173.3

(56) References Cited

U.S. PATENT DOCUMENTS

| | | | |
|---|---|---|---|
| 4,676,715 A | | 6/1987 | Imbault et al. |
| 4,768,924 A | * | 9/1988 | Carrier et al. ............... 415/189 |
| 5,188,507 A | * | 2/1993 | Sweeney ................... 415/173.1 |
| 5,192,185 A | * | 3/1993 | Leonard .................... 415/170.1 |
| 6,113,349 A | | 9/2000 | Bagepalli et al. |
| 6,197,424 B1 | | 3/2001 | Morrison et al. |
| 6,726,448 B2 | * | 4/2004 | Farrell et al. ............. 415/173.3 |

FOREIGN PATENT DOCUMENTS

| | | |
|---|---|---|
| JP | 10-103013 | 4/1998 |
| JP | 10-103014 | 4/1998 |

OTHER PUBLICATIONS

UK Search Report dated Aug. 22, 2003.

* cited by examiner

Primary Examiner—Hoang Nguyen
(74) Attorney, Agent, or Firm—Griffin & Szipl, P.C.

(57) ABSTRACT

There is disclosed a gas turbine shroud structure comprising: a shroud support component 12 attached to an inner surface of a gas turbine casing 3; a shroud segment 14 divided in a peripheral direction and supported by the inner surface of the shroud support component; and a heat-resistant restricting spring 18 held between the shroud segment and shroud support component to urge the shroud segment inwards in a radial direction. The shroud segment 14 is formed of a ceramic composite material, and includes a coating layer 15 having heat insulation and impact absorption effect on an inner surface of the segment.

6 Claims, 5 Drawing Sheets

Temperature distribution of CMC Shroud

CMC shroud model

Results of bonding strength test

FIG. 8A
FIG. 8B
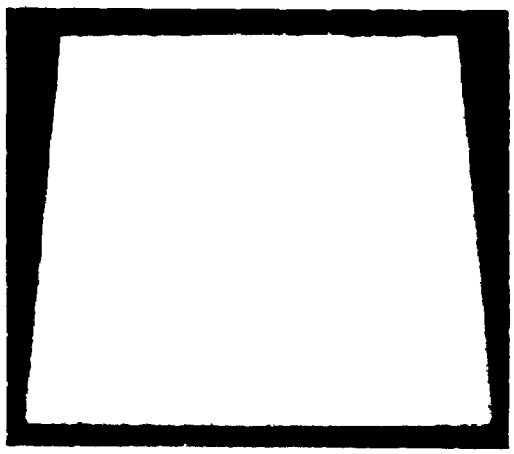
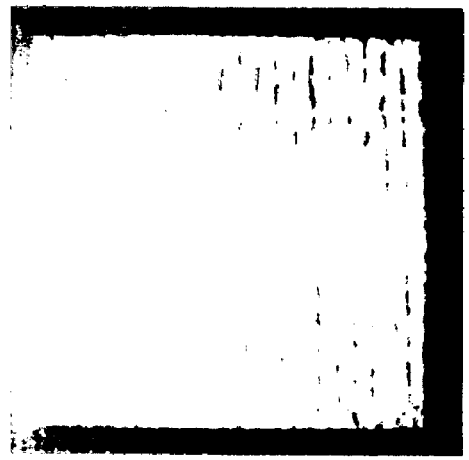
a. Before test
b. After 500 cycles
Photographs of thermal cycle test specimen

GAS TURBINE SHROUD STRUCTURE

BACKGROUND OF THE INVENTION

1. Technical Field of the Invention

The present invention relates to a shroud structure which shrouds a turbine rotator blade of a gas turbine.

2. Description of the Related Art

In a gas turbine, an air compressor compresses air, a combustor combusts fuel in the compressed air, combustion gas drives the turbine, and the air compressor is driven by the driving force.

When an operation temperature of the gas turbine is raised, efficiency is improved. Therefore, the turbine rotator blade, and a turbine shroud and turbine casing which shroud the blade is cooled, and the gas turbine is operated at a high temperature, so that the efficiency has heretofore been improved.

In recent years, from a necessity of enhancement of capability required for development of a jet-engine and consideration to environment, and it has been an important problem to reduce a cooling air amount as well as an engine weight.

A heat-resistant metal has heretofore been used in the turbine shroud, but in recent years a material particularly superior in a high-temperature characteristic has been applied with the high temperature of a turbine portion. Moreover, a thermal barrier coating which is a thermal interference layer is sometimes applied. However, for the metal turbine shroud, it has already been impossible to further reduce the cooling air or weight. For the present situation in which the temperature tends to be further raised, the amount of the cooling air has to be increased. Moreover, the weight cannot be reduced. In other words, metal components have already reached their limitations, and further reduction of the cooling air amount or weight cannot be expected in the situation.

To solve these problems, a shroud of a ceramic composite material (CMC) has also been proposed (e.g., Japanese Patent Application Laid-Open Nos. 10-103013, 10-103014).

In "Gas Turbine Shroud Structure" of the Japanese Patent Application Laid-Open No. 10-103013, as shown in FIG. 1, a cylindrical shroud 1 is constituted of a plurality of segments 2 which are divided a peripheral direction to have circular-arc plate shapes. Opposite edges of each segment along a main-stream gas direction are supported by a support member 4 fixed on an inner peripheral side of a gas turbine casing 3, and each segment 2 is constituted of ceramic and has a double plate structure which includes an outer peripheral side plate portion 2a and inner peripheral side plate portion 2b. It is to be noted that in this diagram, reference numeral 5 denotes a first-stage stationary blade, and 6 denotes a first-stage rotator blade.

However, in the shroud in which such two-dimensional plate-shaped CMC material is used, delamination occurs, a high stress is generated in a portion formed by combining two components 2a, 2b by deformation at a high temperature, and there is a problem of high possibility that the portion is destroyed.

On the other hand, in "Gas Turbine shroud Structure" (FIG. 2) of the Japanese Patent Application Laid-Open No. 10-103014, the respective segments 2 in FIG. 1 are constituted of ceramic, and a section of the segment has a hollow constitution which has a square, trapezoidal, I or another shape by braiding.

However, in the shroud using the braided CMC material, many fibers cannot be included in the braided material. When the segment is lengthened, thermal stress increases. There is a problem that it is difficult to establish strength.

Moreover, in each of the above-described prior-art CMC shrouds, a-countermeasure against mismatch by a thermal expansion difference is not considered for any connected portion to the metal component. There is also a high possibility that a restricted portion is destroyed. Moreover, since a sealing property with the metal component is not considered, the cooling air leaks and deteriorates the capability. Furthermore, a shroud main body is directly exposed to a main-stream gas, and it is therefore difficult to use the shroud main body in high-temperature environment in which a main-stream gas temperature exceeds 1200° C. for a long time. Moreover, there has been a possibility that the whole shroud is destroyed at a collision time with a rotator blade tip end.

SUMMARY OF THE INVENTION

The present invention has been developed to solve the above-described various problems. That is, an object of the present invention is to provide a gas turbine shroud structure in which a shroud main body is not directly exposed to a main-stream gas exceeds 1200° C. and which can avoid destruction of a shroud even in collision of a rotator blade tip end, handle a thermal expansion difference, prevent generation of a high thermal stress, and enhance gas turbine capability.

According to the present invention, there is provided a gas turbine shroud structure comprising: a shroud support component (12) attached to an inner surface of a gas turbine casing (3); a shroud segment (14) divided in a peripheral direction and supported by the inner surface of the shroud support component; and a heat-resistant restricting spring (18) held between the shroud segment and shroud support component to urge the shroud segment inwards in a radial direction, wherein the shroud segment (14) is formed of a ceramic composite material, and includes a coating layer (15) having heat insulation and impact absorption effect on an inner surface of the segment.

According to a preferred embodiment of the present invention, in the ceramic composite material, a laminated and stitched two-dimensional fabric, or a fabric in which the fiber is three-dimensionally oriented is used.

According to the constitution of the present invention, the shroud segment (14) is formed of the ceramic composite material using the laminated and stitched two-dimensional fabric or the fabric in which the fiber is three-dimensionally oriented, and therefore delamination can be prevented. Moreover, since the coating layer (15) having the heat insulation and impact absorption effect is formed on the inner surface of the shroud segment, the shroud main body is not directly exposed to the main-stream gas, and can be used in a high-temperature environment at a main-stream gas temperature exceeding 1200° C. for a long time, and destruction of a shroud can be avoided even in collision with a rotator blade tip end.

Moreover, since the heat-resistant restricting spring (18) is held between the shroud segment (14) and shroud support component (12) to urge the shroud segment inwards in a radial direction, the thermal expansion difference can be handled, and high thermal stress can be prevented from being generated. Furthermore, a gap by backlash of the shroud support component and shroud segment is suppressed, and the leak amount of the cooling air can be reduced, so that the capability is improved.

According to the preferred embodiment of the present invention, the restricting spring (18) binds the shroud segment (14) to the shroud support component (12) and has elasticity which can follow the thermal expansion difference from the shroud support component in the radial direction.

According to the constitution, a high thermal stress is prevented from being generated by the thermal expansion difference of the shroud segment (14) in axial and radial directions, the gap by the clearance in the radial direction can be prevented by the restricting spring (18), and the leak of the cooling air can be suppressed.

Moreover, the coating layer (15) is ceramic including pores, or ceramic composite material. The ceramic including the pores or ceramic composite material is preferably formed by ceramic containing mullite, SiC, $Al_2O_3$, zircon, $SiO_2$, ZrC, HfC which are main components.

According to the constitution, the coating layer can be formed to have the heat insulation and impact absorption effect.

Other objects and advantageous characteristics of the present invention will be apparent from the following description with reference to the accompanying drawings.

BRIEF DESCRIPTION OF DRAWINGS

The patent or application file contains at least one drawing executed in color. Copies of this patent or patent application publication with color drawing(s) will be provided by the Office upon request and payment of the necessary fee.

FIGS. 8A and 8B show photographs before and after a heat cycle test of the coating layer of the present invention.

DESCRIPTION OF THE PREFERRED EMBODIMENT

Figure 1:
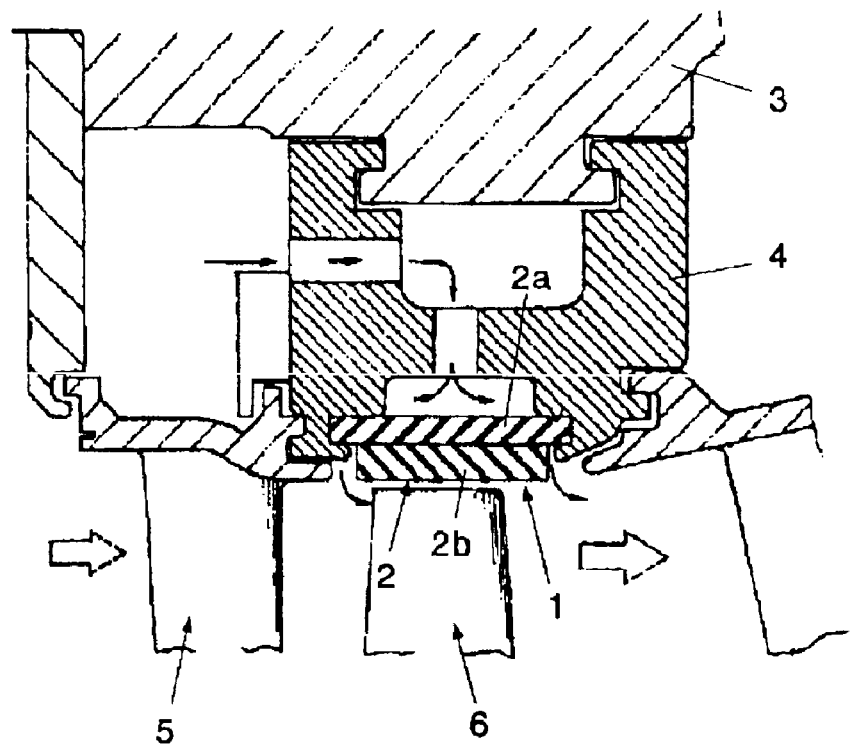
FIG. 1 is a diagram showing a related-art gas turbine shroud structure.
Figure 2:
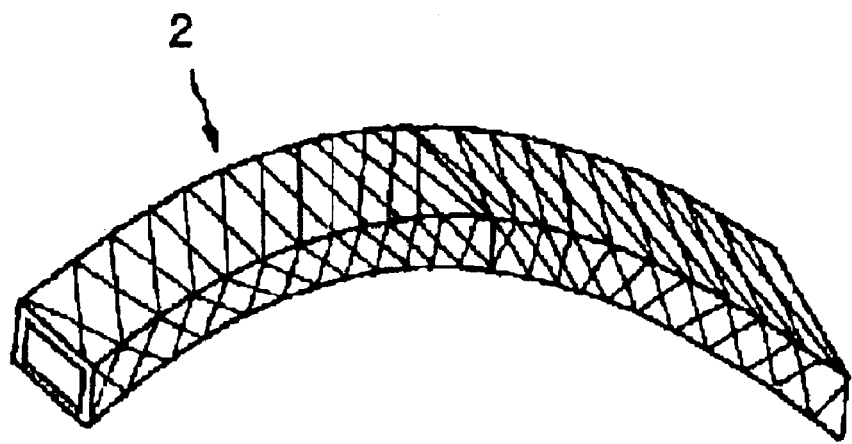
FIG. 2 is a diagram showing another segment of the related-art gas turbine shroud structure.

A preferred embodiment of the present invention will be described hereinafter with reference to the drawings. It is to be noted that common portions in the respective drawings are denoted with the same reference numerals, and redundant description is omitted.

FIGS. 3A to 3D are sectional views showing the gas turbine shroud structure according to the present invention. As shown in the drawings, the gas turbine shroud structure of the present invention includes a shroud support component 12, shroud segment 14, and restricting spring 18.

The shroud support component 12 is a metal component, and is attached to the inner surface of a gas turbine casing 3 via bolts.

Figure 3A:
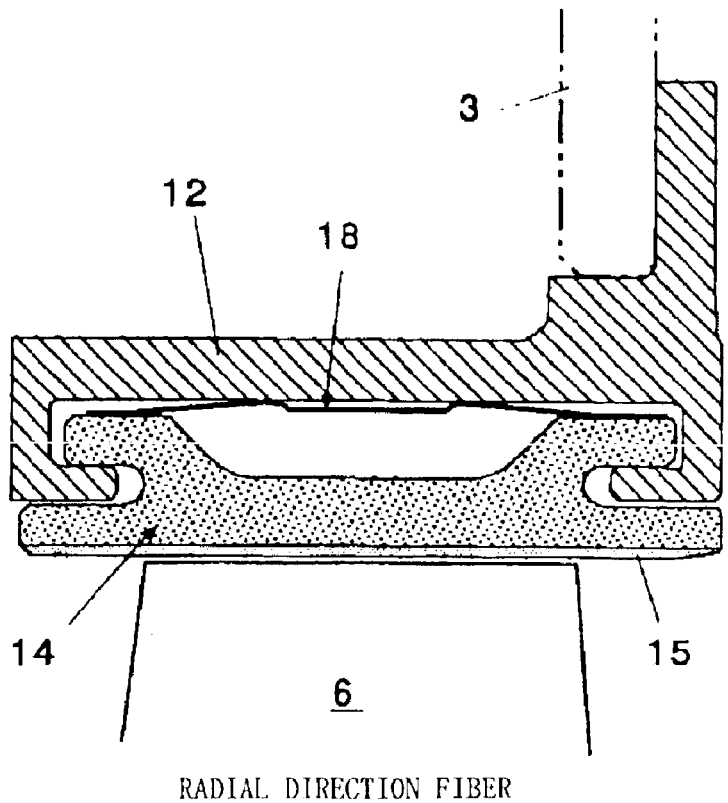
FIGS. 3A to 3D are sectional views showing the gas turbine shroud structure according to the present invention.
Figure 3B:
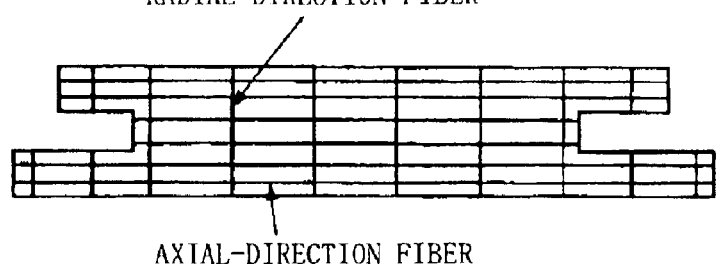
Figure 3C:
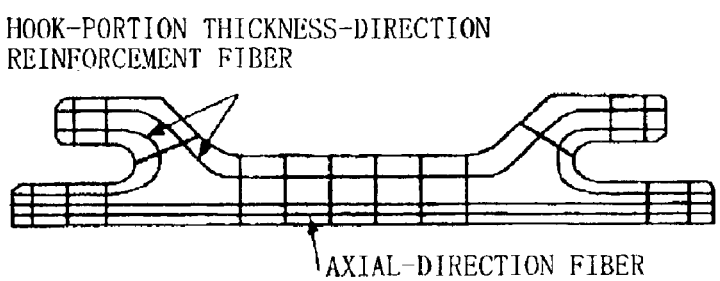
Figure 3D:
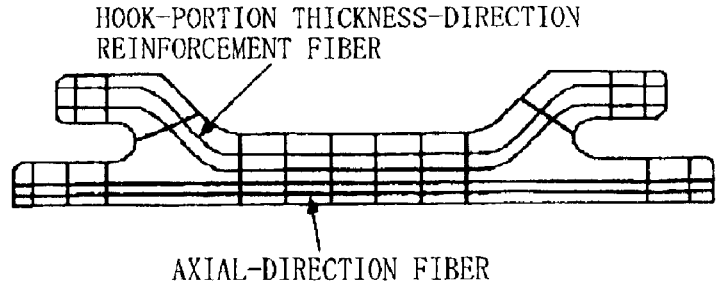

The shroud segment 14 is a circular arc member divided in a peripheral direction, and is fixed to the inner surface of the shroud support component 12. As shown in FIGS. 3B, 3C, 3D, the shroud segment 14 is formed of a ceramic composite material using a laminated and stitched two-dimensional fabric, or a fabric in which the fiber is three-dimensionally oriented.

FIG. 3B shows an orthogonal three-dimensional fabric which includes fibers in a plate thickness direction (diametric direction of an engine) and which is reinforced by two-dimensional stitching in the plate thickness direction for a purpose of reinforcing a destruction mode of a shroud thickness direction (diametric direction of the engine) in which a hook portion is assumed.

FIGS. 3C and 3D show the fabric in which the fiber constituting the hook portion is continuously bent and disposed to reinforce a shroud thickness direction and the continued fiber reinforces the shroud thickness direction (diametric direction of the engine).

Moreover, the shroud segment 14 includes a coating layer 15 having heat insulation and impact absorption effect on the inner surface thereof. The coating layer 15 is ceramic including pores, or ceramic composite material, and is preferably formed by the ceramic containing mullite, SiC, $Al_2O_3$, zircon, $SiO_2$, ZrC, HfC which are main components.

As a coating method, ceramic molding methods such as spray coating and slurry methods, and methods for matrix molding of CMC, such as CVI and PIP can be used.

The restricting spring 18 is formed of a heat-resistant thin metal, and is held between the shroud segment 14 and shroud support component 12 to urge the shroud segment 14 inwards in a radial direction. This restricting spring 18 has elasticity which can follow a thermal expansion difference of the shroud segment 14 in the radial direction.

According to the above-described constitution of the present invention, the shroud segment 14 is formed of the ceramic composite material using the laminated and stitched two-dimensional fabric, or the fabric in which the fiber is three-dimensionally oriented, so that delamination can be prevented. Moreover, since the coating layer 15 having the heat insulation and impact absorption effect is formed on the inner surface of the shroud segment, the shroud main body is not directly exposed to main-stream gas. The shroud can be used in a high-temperature environment at a main-stream gas temperature exceeding 1200° C. for a long time, and destruction of the shroud can be avoided even in collision with a rotator blade tip end.

Moreover, the heat-resistant restricting spring 18 is held between the shroud segment 14 and shroud support component 12 to urge the shroud segment inwards in the radial direction. Therefore, the thermal expansion difference can be handled, a high thermal stress can be prevented from being generated, a gap by the clearance between the shroud support component and shroud segment is suppressed, and a leak amount of cooling air can be reduced, so that capability is enhanced.

Moreover, according to this constitution, the high thermal stress can be prevented from being generated by the thermal expansion difference of the shroud segment 14 in axial and radial directions, the gap by the backlash in the radial direction is suppressed by the restricting spring 18, and the leak amount of the cooling air can be reduced, so that the capability is enhanced.

The coating layer 15 is formed of the ceramic including the pores or the ceramic composite material, and can be the coating layer which has the heat insulation and impact absorption effect.

The preferred embodiment of the present invention will be described hereinafter in detail.

1. An aerial demand is expected to be twice the existing demand around 2010, and a $CO_2$ discharge amount unavoidably becomes twice the existing amount with an extension of the existing technique. Therefore, to reduce an influence on the environment, the $CO_2$ discharge amount needs to be reduced to the existing level, and there has been a demand for rapid enhancement of an engine associated technique and airplane body associated technique.

A ceramic matrix composite (CMC) is lightweight and superior in heat resistance. Therefore, when the material is applied to a jet engine component, weight reduction of a jet engine and reduction of a fuel consumption ratio can be anticipated. Many researches for application to aerospace components of CMC have been performed, and works have intensively been performed for practical use in recent years.

An object of the present invention is to apply CMC having about ¼ specific gravity as compared with a nickel group alloy and superior in heat resistance to a turbine shroud component which is directly exposed to a main-stream high-temperature gas in the jet engine for an supersonic airplane, and to realize the $CO_2$ discharge amount reduction by a technical development concerning the reduction of the engine weight and fuel consumption ratio. When the CMC is applied to the turbine shroud, there are the following technical problems.

A manufacturing process which keeps a material strength while satisfying a three-dimensional shape A fastening structure of the CMC and metal components which have a large thermal expansion difference Durability in a gas at a high temperature exceeding 1500° C.

In the embodiment of the present invention, to evaluate manufacturing process required for applying the CMC to the turbine shroud and characteristics for forming the coating layer, a shroud model is made on trial, and adequacy of a manufacturing process is confirmed. Moreover, a test specimen in the form of a CMC flat plate on which the coating layer is formed is made on trial, and adhesion and heat resistance cycle characteristics are evaluated.

2. Study of CMC Shroud Structure

Figure 4A:
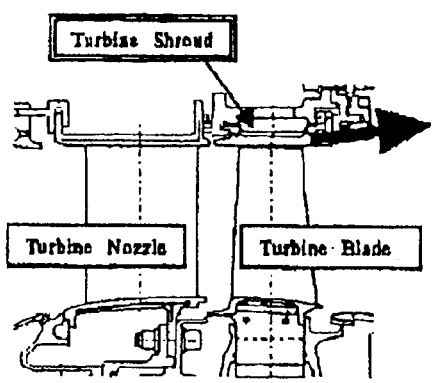
FIGS. 4A and 4B are basic concept diagrams of the gas turbine shroud structure according to the present invention.
Figure 4B:
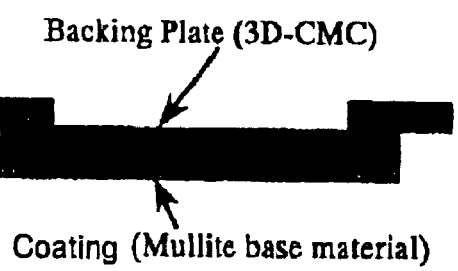

A basic concept of the CMC shroud of the present invention is shown in FIGS. 4A and 4B. First, two-dimensional and three-dimensional fabrics are considered as a fabric structure of the CMC shroud model. However, since interlayer strength is a problem in a two-dimensional laminate material, a flat plate fabric having an orthogonal three-dimensional fiber orientation is used. For the flat plate fabric, a method of manufacturing a rectangular parallelepiped fabric and subsequently bending the fabric in a circular arc shape was selected. For the fiber for use in the flat plate fabric, Tyranno ZMI grade having a fiber diameter of 11 μm and manufactured by Ube Industries, Ltd. was used.

After weaving the ZMI fiber into the flat plate fabric having the orthogonal three-dimensional fiber orientation, the surface of the fiber was coated with carbon in about 0.1 to 0.2 μm by CVD method. For a matrix, the matrix of SiC was formed by a hybrid process constituted by combining a chemical vapor infiltration (CVI) method and polymer impregnation and pyrolysis (PIP) method.

The existing heat resistance of the CMC is in a range of 1200 to 1400° C., and the CMC needs to be protected from a main-stream gas at a high temperature exceeding 1500° C. Therefore, the CMC shroud is coated as shown in FIG. 4B. For the coating, a mullite based material having a thermal expansion close to that of the CMC was selected.

Figure 5:
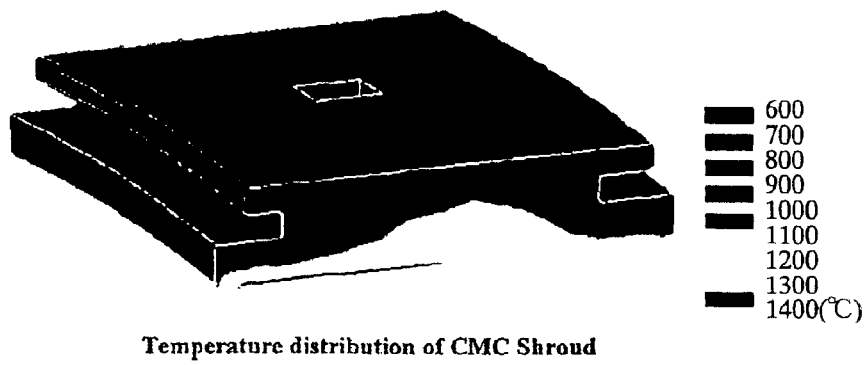
FIG. 5 is a temperature distribution diagram of the gas turbine shroud structure according to the present invention.
Figure 6:
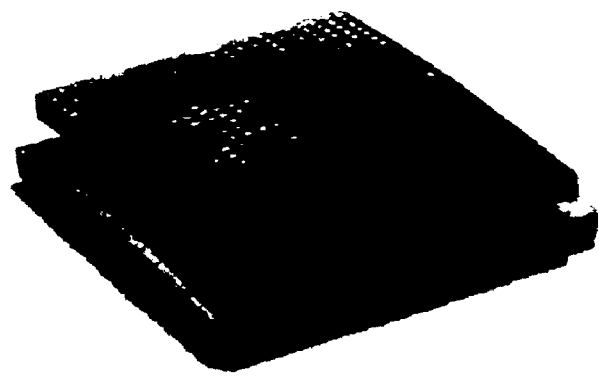
FIG. 6 is a perspective view of the shroud segment of the present invention.

For the shape of the CMC shroud and the coating thickness, validity was studied and set by FEM analysis. A temperature distribution in a 1 mm coating layer is shown in FIG. 5. The shroud is protected from the high-temperature gas by the coating layer, and a shield effect of heat at about 150° C. is also obtained. The CMC shroud made on trial using the above-described process is shown in FIG. 6. A trial manufacturing result of the CMC shroud was satisfactory, and the adequacy of the manufacturing process in the above-described process was confirmed.

3. Coating Layer Evaluation Test Method

To evaluate the adhesion and heat resistance cycle characteristic in the coating of the CMC, a CMC test specimen in the form of the flat plate having the orthogonal three-dimensional fiber orientation was produced. A dimension of each test specimen is shown as follows.

Bonding strength test specimen shape: length of 20 mm, width of 20 mm, thickness of CMC portion of 4 mm, coating layer of 1 mm Thermal cycle test specimen shape: length of 50 mm, width of 50 mm, thickness of CMC portion of 4 mm, coating layer of 1 mm The mullite based material forming the coating layer of each test specimen was disposed by spray coating.

In bonding strength test, metal rods were bonded on coating and CMC sides so as to hold the test specimen, and attached to a tensile tester to conduct the test.

Moreover, in the thermal cycle test, the test specimen was held by a pin, and fixed to a cooling holder. The temperature of the back surface of the test specimen was monitored by a thermocouple, and the temperature of a heating surface was monitored by a pyrometer, while the test specimen was heated by a burner to conduct the test. For the temperature, a temperature state assumed at a study time of the structure of FIG. 5 was simulated, the coating surface (heating surface) temperature was controlled at 1350° C., and the temperature of a cooling surface on the CMC side (back surface) was controlled at about 900° C.

4. Test Result and Consideration

Figure 7:
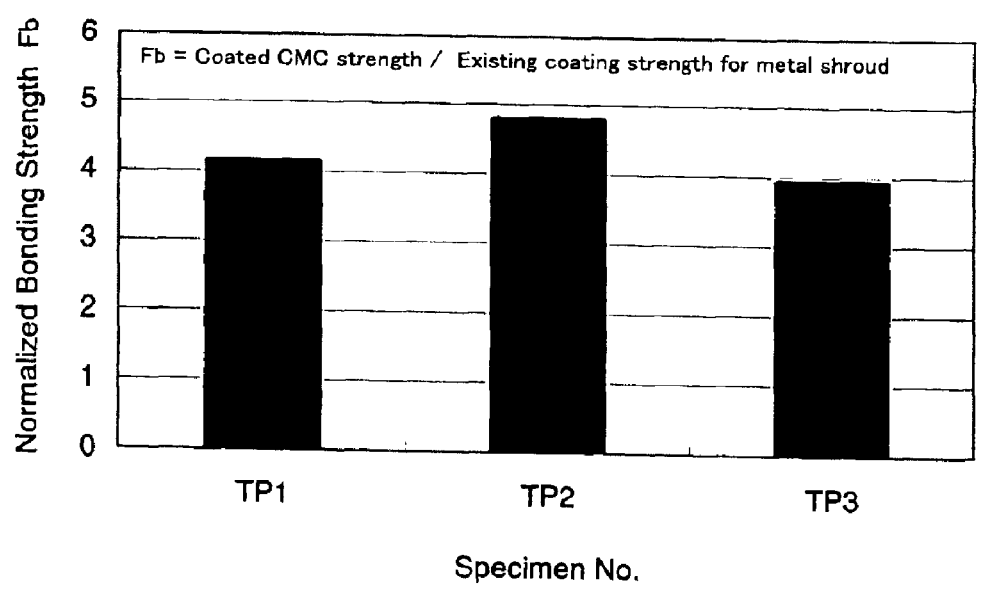
FIG. 7 shows an embodiment showing an adhesion strength of the coating layer of the present invention.

FIG. 7 shows bonding strength test result. An bonding strength is shown in comparison with that of the existing coating on the metal shroud component. It was confirmed that a satisfactory adhesion was obtained as compared with the existing coating.

Conditions of the test specimen after 500 heat cycles are shown in FIGS. 8A and 8B. In the beginning, a very small number of cracks capable of being confirmed by a magnifying glass were generated in a boundary surface of the coating layer and CMC after several cycles. However, even after 500 cycles, the cracks did not proceed much, and the debonding did not occur. This was supposedly because micro cracks were generated in the coating and the thermal stress in the coating was relaxed.

5. The manufacturing process required for applying the CMC to the turbine shroud and the CMC on which the coating layer was formed were evaluated. As a result, the CMC shroud model was manufactured on trial, the manufacturing process property from the CMC using the flat plate fabric having the orthogonal three-dimensional fiber orientation was confirmed, and the adequacy of the applied manufacturing process was confirmed.

As described above, in the present invention, the ceramic composite material is used, including a structure into which a heat interference layer at the rubbing time with the rotator blade tip end is introduced by the coating layer and which protects the CMC functioning as a structure member. In the ceramic composite material, the two-dimensional fabric is laminated and stitched in the CMC portion which is the structure member, or the fabric in which the fiber is three-dimensionally oriented is used. Moreover, during the fastening with the metal component, the material is bound to the metal component having a thermal elongation difference via the spring component.

Since the coating layer is introduced, the material having low thermal conductivity and including the pores is constituted. Thereby, the heat shield effect is obtained. Moreover, the interference layer at the rotator blade tip end rubbing time is constituted, and the CMC functioning as the structure member can be protected from a thermal stress and structure load.

Moreover, for the CMC portion as the structure member, the laminated and stitched two-dimensional fabric, or the fabric in which the fiber is three-dimensionally oriented is used. Thereby, the delamination which is a problem in a two-dimensional material or braiding material can be avoided.

Furthermore, for the fastened portion to the metal component, the component is bound to the metal component having a thermal elongation difference via the spring component, so that mismatch by a thermal deformation difference can be eliminated and destruction can be avoided.

Therefore, the gas turbine shroud structure of the present invention has effects that the delamination can inherently be prevented and the shroud main body is not directly exposed to the main-stream gas. The structure can be used in the high-temperature environment in which the main-stream gas temperature exceeds 1200° C. for a long time. Even when the rotator blade tip end rubs with the shroud, the destruction of the shroud can be avoided. The thermal expansion difference can be handled, and the high thermal stress can be prevented from being generated.

It is to be noted that some preferred embodiments of the present invention have been described, but it could be understood that the scope of rights involved in the present invention is not limited to these embodiments. Contrarily, the rights scope of the present invention includes all improvements, modifications, and equivalents included in the attached claims.

What is claimed is:

1. A gas turbine shroud structure comprising: a shroud support component attached to an inner surface of a gas turbine casing; a shroud segment divided in a peripheral direction and supported by the inner surface of the shroud support component; and a heat-resistant restricting spring held between the shroud segment and the shroud support component to urge the shroud segment inwards in a radial direction, wherein the shroud segment is formed of a ceramic composite material, and includes a coating layer having heat insulation and impact absorption effect on an inner surface of the segment, wherein the ceramic composite material comprises laminated and stitched two-dimensional fabric, or fabric in which a fiber is three-dimensionally oriented.

2. The gas turbine shroud structure according to claim 1, wherein the restricting spring binds the shroud segment onto the shroud support component and has an elasticity which can follow a thermal expansion difference from the shroud support component in a radial direction.

3. The gas turbine shroud structure according to claim 1, wherein the fabric in which the fiber is three-dimensionally oriented is an orthogonal three-dimensional fabric in which the fiber is inserted in a plate thickness direction, or a fabric in which the fiber constituting a hook portion is bent and oriented to continuously reinforce a shroud thickness direction and the shroud thickness direction is reinforced by the continued fiber.

4. The gas turbine shroud structure according to claim 3, wherein the coating layer is a ceramic including pores or a ceramic composite material, wherein each of the ceramic including pores and the ceramic composite material is formed by ceramic containing one or more main components selected from the group consisting of mullite, SiC, $Al_2O_3$, zircon, $SiO_2$, ZrC, and HfC.

5. The gas turbine shroud structure according to claim 1, wherein the laminated and stitched two-dimensional fabric, and the fabric in which a fiber is three-dimensionally oriented, are rectangular parallelepiped fabric subsequently bent in a circular arc shape.

6. A gas turbine shroud structure comprising:

a shroud support component attached to an inner surface of a gas turbine casing;

a shroud segment divided in a peripheral direction and supported by the inner surface of the shroud support component; and a heat-resistant restricting spring held between the shroud segment and the shroud support component to urge the shroud segment inwards in a radial direction, wherein the shroud segment is formed of a ceramic composite material, and includes a coating layer having heat insulation and impact absorption effect on an inner surface of the segment, wherein the ceramic composite material comprises laminated and stitched two-dimensional fabric, or fabric in which a fiber is three-dimensionally oriented, wherein the coating layer is a ceramic including pores or a ceramic composite material, wherein each of the ceramic including pores and the ceramic composite material is formed by ceramic containing one or more main components selected from the group consisting of mullite, SiC, $Al_2O_3$, zircon, $SiO_2$, ZrC, and HfC.

* * * * *